United States Patent [19]
Smith, Jr.

[11] 3,785,496
[45] Jan. 15, 1974

[54] OIL RECLAIMING DEVICE FOR REMOVING OIL FROM THE SURFACE OF WATER

[75] Inventor: Raymond Peter Smith, Jr., South Williamsport, Pa.

[73] Assignee: Craftmaster, Inc., Williamsport, Pa.

[22] Filed: July 28, 1972

[21] Appl. No.: 276,000

[52] U.S. Cl............................ 210/242, 210/DIG. 21
[51] Int. Cl............................................ E02b 15/04
[58] Field of Search................ 210/83, 242, DIG. 21

[56] References Cited
UNITED STATES PATENTS

| | | | |
|---|---|---|---|
| 3,623,609 | 11/1971 | Ainlay | 210/242 |
| 3,661,263 | 5/1972 | Peterson | 210/DIG. 21 |
| 3,656,624 | 4/1972 | Walton | 210/DIG. 21 |
| 3,219,190 | 11/1965 | Tnune | 210/242 |
| 3,534,859 | 10/1970 | Amero et al. | 210/DIG. 21 |
| 3,731,813 | 5/1973 | Tipton | 210/242 |

FOREIGN PATENTS OR APPLICATIONS
1,177,776  8/1967  Great Britain ............. 210/DIG. 21

*Primary Examiner*—Samih N. Zaharna
*Assistant Examiner*—T. A. Granger
*Attorney*—Richard C. Sughrue et al.

[57] ABSTRACT

An apparatus for removing oil slicks from the surface of the water which includes two independently pivotable booms connected together to form a V. A paddle wheel is connected to the two booms across the open end of the V for skimming the oil off the surface of the water and forcing the oil towards the apex of the V. A sump is located at the apex of the V for collecting the oil forced to the apex of the V by the paddle wheel. A flexible stabilizer bar is connected between the two booms for stabilizing the booms and limiting the maximum amount that the booms may pivot with respect to each other.

5 Claims, 4 Drawing Figures

PATENTED JAN 15 1974 3,785,496

OIL RECLAIMING DEVICE FOR REMOVING OIL FROM THE SURFACE OF WATER

BACKGROUND OF THE INVENTION

1. Field of the Invention

This invention relates to an apparatus for removing oil slicks from the surface of water and more particularly to an apparatus including two independently pivotable booms which form a V and a paddle wheel across the open end of the V for skimming oil from the surface of the water and forcing it towards the apex of the V.

2. Description of the Prior Art

In prior art oil skimming devices, paddle wheels connected to unitary structures have been used to force oil into a sump mounted on the unitary structure. Devices of this type, however, are of little value in heavy seas because of the unitary nature of the structure. The device will tend to roll and move well above and below the oil-water surface. Therefore, a sump which is used to collect the oil will either receive a large amount of water when the device drops below the oil-water surface or will collect little or no oil when the device is above the oil-water surface. Furthermore, devices of this type will be extremely large and bulky and thus not easily transported from place to place. If the device is reduced in size to facilitate transportation, then it will not cover a large enough surface area to be truly effective.

SUMMARY OF THE INVENTION

It is the object of this invention to provide a device for removing oil slicks on the surface of water which is not subject to rolling in heavy seas.

It is another object of this invention to provide a device which includes two independent booms, which pivot with respect to each other, such that the plane through the two booms remains substantially parallel to the surface of the water.

It is another object of this invention to provide two booms which form a V such that a large surface area of water is enclosed by the two booms.

It is a further object of this invention to provide a device in which the booms may be easily disconnected for easy transportation of the device from one location to another.

It is still a further object of this invention to mount a paddle wheel across the open end of the V formed by the two booms for skimming oil on the surface of the water and forcing it toward the apex of the V.

It is still another object of this invention to provide a sump at the apex of the V for collecting the oil forced by the paddle wheel towards the apex of the V and thus remove it from the surface of the water.

These objects are accomplished by providing a device for removing oil slicks from the surface of the water which includes first and second independently pivotable booms which are connected together to form a V. The connector which holds the two booms together permits them to pivot independently about an axis parallel to the horizontal surface of the water. In this way each boom will ride independently on the surface of the water and the device as a whole will not roll in heavy seas but rather maintain a fixed relationship with the surface of the water. The connector is also adapted so that the booms may easily be decoupled. The booms are decoupled so that the device is easily transportable from place to place in a disassembled state. Because of the ease of transportation, the device may be quickly set up on the occurrence of an oil slick and collect the oil before it has an opportunity to spread over an extremely large area.

A paddle wheel is coupled between the two booms across the open end of the V. The paddle wheel skims oil off of the surface of the water and forces it towards the apex of the V. A sump is positioned at the apex of the V for collecting the oil forced by the paddle wheel towards the apex of the V and thus removes the oil from the surface of the water.

A flexible stabilizer bar is connected between the two booms for stabilizing the V shape formed by the two booms. The stabilizer bar also limits the maximum amount that the booms may pivot with respect to each other.

The device may be moved through the water by means of a ship or boat. The oil which is removed from the surface of the water is pumped from the sump onto the ship by means of a pump located on the device or on the ship.

DESCRIPTION OF THE PREFERRED EMBODIMENT

Figure 1:
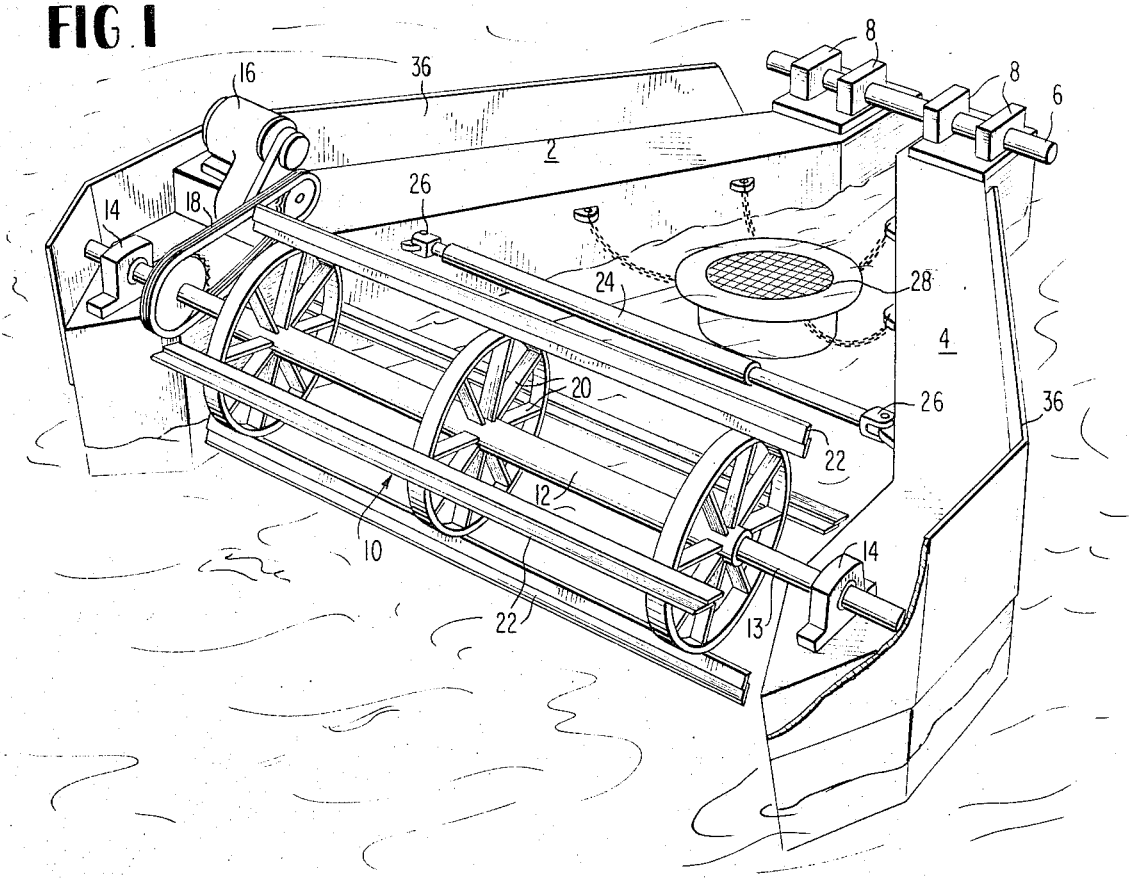
FIG. 1 is a perspective view of the preferred embodiment of the present invention.
Figure 3:
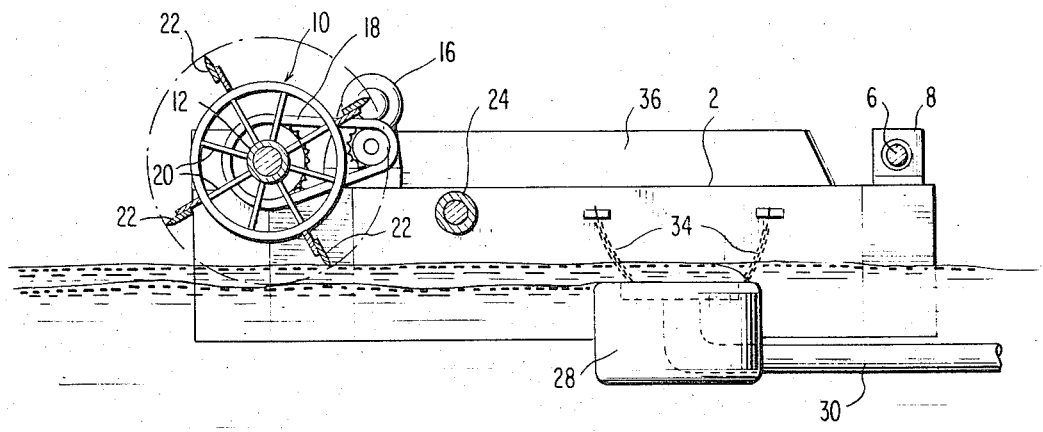
FIG. 3 is a longitudinal section through Section III—III in FIG. 2.
Figure 2:
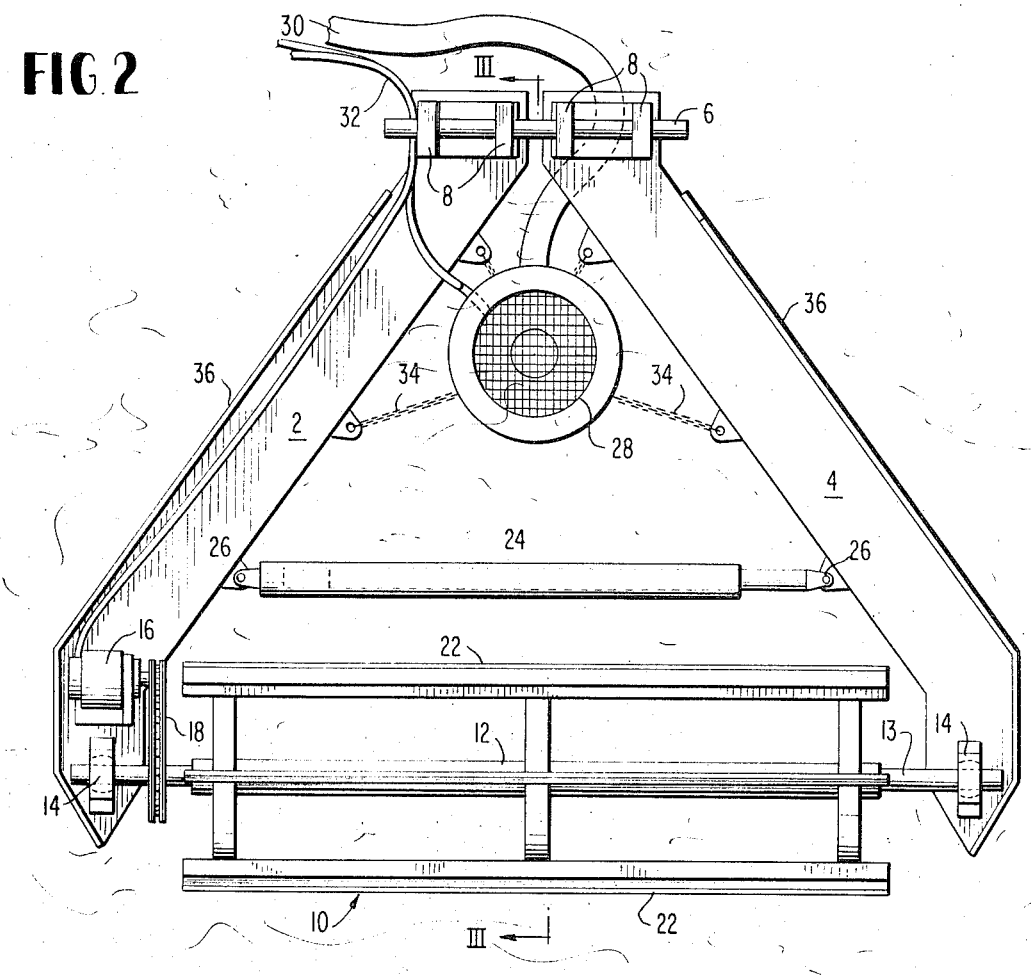
FIG. 2 is a top view of the preferred embodiment of the present invention.

Referring to the figures, a first boom 2 and a second boom 4 are coupled together by means of a shaft 6. The booms are coupled to shaft 6 by pillow block bearings 8 in such a manner that each boom rotates independently about the axis of shaft 6. Booms 2 and 4 are positioned with respect to each other such that they form a V, with the apex of the V at the point where the booms are coupled to the shaft 6. A paddle wheel 10, having a main shaft 12, is mounted between the ends of the booms 2 and 4 at the open end of the V. The shaft 12, which includes a telescoping portion 13, is mounted on pillow blocks 14 on the ends of booms 2 and 4. A motor 16, mounted on boom 2, is used to rotate the paddle wheel 10 and is coupled thereto by chain drive 18.

Paddle wheel 10 includes spokes 20 and blades 22 mounted on the ends of some of the spokes. The blades 22 are positioned such that the extreme tip of the blade is at the depth of an oil slick on the surface, that is, the depth is to the oil-water surface. Therefore, when paddle wheel 10 rotates, the blades 22 push all of the oil on the surface of the water, but no water below the oil, towards the apex of the V formed by booms 2 and 4.

The depth of blades 22 of paddle wheel 10 may be changed by changing the ballast in booms 2 or 4. If the oil slick is very thick and it is desired to lower the depth of blades 22, the ballast in booms 2 and 4 is merely increased, thus lowering the blades. The depth of blades 22 may also be varied by using variable height mounts for pillow blocks 14. By adjusting the mounts the paddle wheel may be raised or lowered. The apparatus may therefore be quickly and easily adjusted to skim the maximum amount of oil from the surface of the water in accordance with existing conditions.

Figure 4:
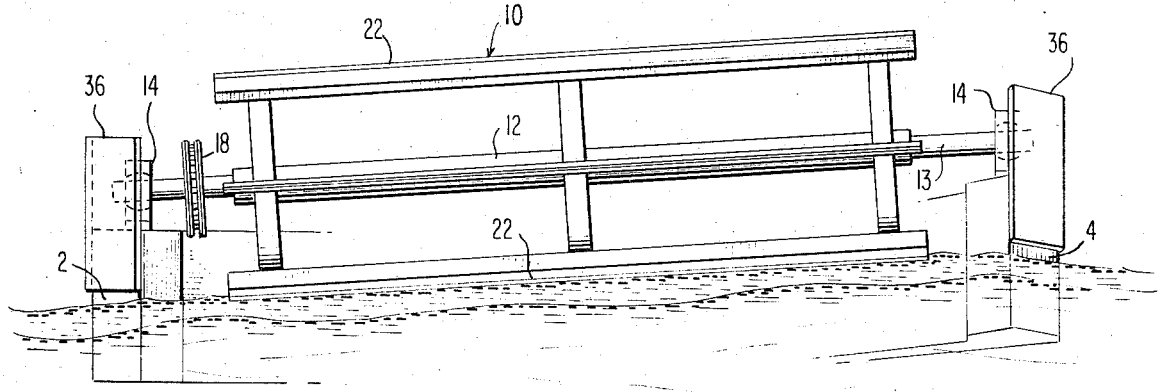
FIG. 4 is a front elevation showing the booms pivoted with respect to each other.

Pillow blocks 14, which couple shaft 12 to booms 2 and 4, are constructed such that the booms may rotate with respect to each other. If the water surface should swell at one boom and not at the other, the paddle wheel will then assume a position, which is parallel to the surface of the water, at an angle with respect to the horizontal. When the booms rotate telescoping portion 13 of shaft 12 telescopes out to provide the additional length to shaft 12. FIG. 4 illustrates the booms at an angle with respect to the horizontal. Because of the independent rotation of the booms, the apparatus has great stability even in rough seas and even more important the paddle wheel always remains parallel to the surface of the water.

A telescoping stabilizing bar 24 is connected between booms 2 and 4. When one boom rotates with respect to the other, stabilizing bar 24 is lengthened through its telescoping action. However, the telescoping is limited such that the maximum angle that one boom may rotate with respect to the other is 30°. The stabilizing bar 24 is connected to booms 2 and 4 by means of eyelets 26 affixed to the booms.

A sump or skimmer 28 of conventional construction is connected to booms 2 and 4 and at the apex of the V. The oil skimmed off of the surface of the water by paddle wheel 10 is forced back into the sump 28. From the sump the oil is pumped through line 30 into a ship, a storage device mounted on the device, etc. (not shown). The pump may be mounted on booms 2 or 4 or may be located on the ship. Power to the sump and to motor 16 is received from line 32 which is connected to a power source also located on the ship. The sump 28 is connected to booms 2 and 4 by means of chains 34.

Sump 28 has an adjustable ballast so that it may be raised or lowered with respect to the surface. It is positioned so that it will collect the maximum amount of oil, but no water.

The device may be propelled through the water by a drive, mounted on the booms, a ship, or any other convenient method.

One of the essential requirements of devices for skimming oil is that it be readily transportable from one location to another so that there is a quick reaction to oil leaks or spillage and oil may be removed from the surface of the water before it spreads over too large a surface area. The above described device may be easily separated into four major components, each of which is small with respect to the assembled device, in order to provide for easy transportation. To disassemble the device, shaft 12 is removed from pillow blocks 14, thus separating the paddle wheel 10 from the booms. As an alternative, paddle 12 may be folded back on one of the booms by removing only one end from the pillow blocks. Chains 34 are disconnected from booms 2 and 4, thereby separating sump 28 from the booms. Finally, shaft 6 is withdrawn from pillow blocks 8 and the two booms may be separated. Once separated, the two booms may be folded together, using a hinge mechanism, or may merely be carried separately and aligned parallel with the paddle wheel 10. It can readily be seen that in the disassembled state the apparatus is very small with respect to its assembled size.

Although booms 2 and 4 are shown having a rectangular cross section, any cross section, such as circular, may also be used.

The booms 2 and 4 may have flaps 36 mounted on the inside (not shown) or the outside as shown in the figures to prevent water from coming over the sides of the booms and then being collected by sump 28.

While the invention has been particularly shown and described with reference to the preferred embodiment thereof, it will be understood by those skilled in the art that various changes in form and details may be made therein without departing from the spirit and scope of the invention.

What is claimed is:
1. An apparatus for collecting oil from the surface of a body of water, said apparatus comprising:
   two flotatable booms, each boom having a first end and a second end,
   means connecting the first ends of said booms together for pivoting independently about a horizontal axis and defining the apex of a V-shaped structure,
   said second ends of said flotatable booms being spaced apart to define the open end of a V-shaped structure,
   paddle means mounted on a shaft, said shaft including telescoping means permitting the shaft to vary in length,
   pillow block means mounting the ends of said shaft to said second ends of the respective flotatable booms to permit the ends of said shaft to vary their angular position independently relative to the second ends of said booms,
   drive means for driving said paddle means about said shaft axis,
   collection means positioned generally at the apex of the V-shaped structure for collecting the oil forced by the paddle means toward the apex of the V for removing the oil from the surface of the body of water, and
   means for restraining lateral movement between the spaced second ends of said flotatable booms and for restraining relative movement of said booms about said horizontal pivot axis.

2. The apparatus as set forth in claim 1, wherein said restraining means includes a telescoping bar having one end coupled to said first boom means and the other end coupled to said second boom means.

3. The apparatus as set forth in claim 1, wherein said paddle means comprises:
   a paddle wheel including a plurality of blades mounted on said shaft and extending radially outwardly therefrom.

4. The apparatus as set forth in claim 1, wherein said drive means comprises:
   a. a motor mounted on one of said boom means;
   b. a gear means operatively connected to said paddle means; and
   c. chain means coupling said motor means to said gear means.

5. The apparatus as set forth in claim 1, wherein said collection means comprises an oil skimmer positioned between said flotatable booms and between said first ends of said boom means and said paddle means, said skimmer being floatable and further including flexible means for attaching said skimmer to both booms to limit movement of said skimmer on said water relative to said booms on either side thereof.

* * * * *